Patented Mar. 30, 1943

2,315,375

UNITED STATES PATENT OFFICE 2,315,375

SULPHO - TRICARBOXYLIC ACID COMPOUNDS AND PROCESS OF PREPARING SAME

Paul Nawiasky, Summit, and Gerhard Ewald Sprenger, Westfield, N. J., assignors to General Aniline & Film Corporation, a corporation of Delaware No Drawing. Application January 4, 1939, Serial No. 249,254

21 Claims. (Cl. 260—481)

This invention relates to new derivatives of aliphatic tricarboxylic acids and to processes of preparing the same. More particularly this invention concerns certain new sulpho-tricarboxylic acids as well as esters thereof and also processes of preparing these compounds.

This invention has as its object, the preparation of a number of new chemical compounds that are characterized by having surface active properties. A further object is to manufacture a number of these new chemical compounds from relatively inexpensive raw materials. These and other important objects will appear from the detailed description given below.

We have found that sulpho-tricarboxylic acids and salts including organic ammonium salts and esters thereof are very useful products which are surface-active and resistant to chemical change. The stability of a certain number of our compounds is quite surprising in view of the accumulation of negative groups on a single carbon atom through the introduction of a sulpho group which accumulation in general lowers the stability of a carboxylic acid compound to such a degree that oftentimes a carboxylic acid group is split off. However, contrary to expectations we have found that sulpho-tricarboxylic acids are very stable and that their esters retain their wetting strength even when used in an alkaline solution.

Our discovery that aliphatic tricarboxylic acids may be sulphonated and converted into esters of sulpho-tricarboxylic acids possessing very desirable surface active properties opens up an entirely new field for the production of detergents, wetting, washing, emulsifying and like agents. Aconitic acid, an unsaturated aliphatic tricarboxylic acid is easily prepared from citric acid, a raw material that is relatively inexpensive and available in practically unlimited quantities. As a matter of fact the production of citric acid at the present time is limited only by the lack of uses therefor. The present invention, therefore, offers an entirely new field of use for citric acid.

Aliphatic tricarboxylic acids which may be used in accordance with our invention may be symmetrical or unsymmetrical saturated or unsaturated tricarboxylic acids, as for example: ethane tricarboxylic acid, propane $\alpha$, $\alpha$, $\gamma$ tricarboxylic acid, tricarballylic acid, propane $\alpha$, $\beta\beta$-tricarboxylic acid, propane $\alpha$,$\alpha\beta$-tricarboxylic acid,$\alpha$-carboxy adipic acid, isobutane tricarboxylic acid and the unsaturated acids ethylene tricarboxylic acid, iso aconitic acid, aconitic acid, $\gamma$-butylene $\alpha$, $\beta$, $\gamma$ tricarboxylic acid and methyl aconitic acid. The above named acids are disclosed as typical aliphatic tricarboxylic acids and it should be understood that we do not intend to be restricted thereto since it is apparent that other acids may be used. As a matter of practical importance, aconitic acid is the preferred acid insofar as our invention is concerned since, as was mentioned above, citric acid from which it is easily manufactured by dehydration is quite inexpensive and is available in almost unlimited quantities.

The sulpho-tricarboxylic acids and their esters, according to our invention, may be prepared in a number of ways. Saturated tricarboxylic acids may be treated with strong sulphonating agents such as sulphur trioxide or fuming sulphuric acid to obtain the corresponding sulpho-tricarboxylic acids or halogen substituted saturated or unsaturated tricarboxylic acids may be treated with an alkali metal sulphite by which treatment a sulpho group is substituted for a halogen atom. However, most important for our invention is the preparation of sulpho-tricarboxylic acids from the corresponding unsaturated acids. The easily obtainable aconitic acid reacts, for instance, with sulphurous acid salts to form, by way of addition, salts of sulpho-tricarballylic acid.

The esters of sulpho-tricarboxylic acids and their salts which are the object of our invention may be prepared from sulpho-tricarboxylic acids and alcohols by way of the known methods of esterification. Another improved method which we have found very useful in the pursuit of our invention is the treatment of the ester of an unsaturated tricarboxylic acid with the sulphite of an alkali metal or ammonium to form an alkali or ammonium salt of the ester of the corresponding sulpho-tricarboxylic acid.

The alcohols that may be used for the formation of the esters in accordance with our invention may be of the most diverse kinds depending only upon the particular properties desired in the final esters. In general, it may be said that any of the monohydric paraffin alcohols can be used. Such alcohols, of course, include methyl and ethyl alcohol as well as the various isomers of propyl, butyl, amyl, hexyl, heptyl, octyl and higher alcohols as, for instance the higher fatty alcohols such as dodecyl, hexadecyl, cetyl, oleyl and stearyl which are obtainable by reduction of the higher fatty acids. Instead of using the pure alcohols it is also desirable to use various commercial alcohols or mixtures of alcohols such as the mixture of higher alcohols formed as a by-product in the manufacture of methanol from carbon monoxide and hydrogen. In addition to the foregoing various polyhydric alcohols and also ether alcohols may be used such as ethylene glycol, butylene glycol and the like, diethylene glycol and the methyl, ethyl, propyl etc. ethers of ethylene or diethylene glycol or their homologues. As typical cyclic alcohols that may be used in accordance with our invention there are mentioned cyclohexanol, methyl cyclohexanol, benzyl alcohol, furfuryl alcohol, α-terpineol, borneol, phenol, xylenols, parabutyl phenols and other alkylated phenols or their hydrogenation products.

The particular alcohol or alcohols used for forming our esters depends upon the particular properties desired in the final product. In general the alcohols of low molecular weight yield easily soluble esters which are particularly suitable as dispersing agents whereas those of high molecular weight yield products with greater wetting strength. While an upper limit is by no means fixed, we have found that in general the esterification of the three carboxyl groups with the same alcohol having at most eight carbon atoms in the molecule represents the upper limit beyond which our products diminish in solubility to such an extent that their usefulness as wetting agents is impaired. The tri-esters obtained from higher molecular alcohols although having inferior wetting properties are, however, eminently suitable for other purposes such as emulsifying, deemulsifying and textile finishing agents.

It is to be understood that our esters need not be the tri-esters of a single alcohol but that various mixed esters are within the purview of our invention. It is obvious that a tricarboxylic acid may be esterified with any one combination of alcohols, including the monohydric saturated or unsaturated aliphatic alcohols, aliphatic polyhydric alcohols, their esters having at least one remaining free hydroxyl group and other polyhydric alcohols with at least one free hydroxyl group and in which one or more hydroxy group has been previously reacted with a suitable acid, such as mono-ricinolein, di-ricinolein, mono-stearin, mono olein etc. Also included are acid alcohols such as ricinoleic acid, tri ricinolein and such polyhydroxy bodies, containing one or more free hydroxy groups and in the remainders of which carboxylic acid residues have been introduced.

The following examples are given in order to illustrate our invention in greater detail. We do not intend to be limited thereto since many variations are possible as will be mentioned in greater detail below:

*Example 1.*—Dry hydrochloric acid gas is passed into a mixture of 420 parts of citric acid and 800 parts of isoamyl alcohol while cooling with ice, until the mixture is saturated. The mixture is then kept for 6 hours at room temperature and then vacuum distilled at 80° C. to remove most of the hydrochloric acid. The residue is neutralized with dilute sodium hydroxide solution, washed with water and then distilled at 207° C. at 2 mm. Hg to obtain 540 parts of tri-isoamyl citrate.

392 parts of the citric acid ester are heated with 87 parts of acetyl chloride to 100° C. for one hour and to 250° C. for 5 hours until 60 parts of acetic acid are distilled off. The residue is distilled at 2 mm. Hg and 204° C. 328 parts of a straw colored liquid which is tri-isoamyl aconitate are obtained.

196 parts of tri-isoamyl aconitate are reacted at 110° C. with 58 parts of sodium bisulphite which is suspended in 100 parts of ethyl alcohol and 50 parts of water. The resultant reaction product tri-isoamyl sodium sulpho-tricarballylate is, in pure form, a brittle solid which is soluble in water. When dissolved in water it displays wetting, lathering and cleansing properties.

*Example 2.*—192 parts of citric acid are esterified in the presence of 1 part sulphuric acid (96%) with 337 parts of 2 ethyl butyl alcohol by refluxing at 120–180° C. until no more water of esterification is removed. Excess ethyl butyl alcohol is distilled off in vacuo (4 mm. Hg) until a temperature of 180° C. is reached. 445 parts of crude tri (ethyl butyl) citrate are thus obtained.

445 parts of the above crude citric acid ester are reacted for 4 hours with 131 parts of thionyl chloride at 120° to 140° C. The reaction product is neutralized with dilute caustic, washed with water and distilled at a vacuum of 2 mm. at 220–230° C. There is thus obtained 363 parts of an almost water-white viscous liquid which is tri (ethyl butyl) aconitate.

217 parts of tri (ethyl butyl) aconitate are reacted at 100° with 50 parts of ammonium bisulphite which is suspended in 75 parts of ethyl alcohol and 38 parts of water. The resultant tri (ethyl butyl) ammonium sulpho-tricarballylate is, in its pure, dry state a waxy white solid. It is soluble in water and most organic solvents and imparts wetting, lathering and cleansing properties to its aqueous solutions.

*Example 3.*—217 parts of tri n-hexyl aconitate, obtained from n-hexyl alcohol and citric acid in an analogous manner to the tri (ethyl butyl) aconitate, are reacted at 100° C. with 50 parts of ammonium bisulphite in the presence of 75 parts of ethyl alcohol and 38 parts of water. The reaction product, tri n-hexyl ammonium sulpho-tricarballylate is dissolved in the solvent mixture, water and alcohol, and can be obtained in its dry form by mere evaporation of the solvents. Thus obtained it is the pure product, except for traces of excess ammonium sulphites. It is, like the tri (ethyl butyl) ammonium sulpho-tricarballylate, a waxy, white solid with very similar properties.

*Example 4.*—259 parts of tri octyl aconitate of the boiling point of 245° C. at 1–2 mg. Hg (obtained from commercial octyl alcohol, i. e. 2-ethyl hexyl alcohol and citric acid and reacting the citric acid ester with thionyl chloride) are reacted at 100 to 110° C. with 50 parts of ammonium bisulphite, in the presence of 75 parts of ethyl alcohol and 38 parts of water. By the addition of the bisulphite to the tri octyl aconitate, tri octyl ammonium sulpho-tricarballylate is formed. It is obtained from the reaction mixture in its dry form by the evaporation of the alcohol-water solvent. As prepared it is a slightly yellow, waxy mass which is less soluble in water than the hexyl compounds. It imparts to its aqueous solutions wetting, lathering and cleansing properties.

*Example 5.*—174 parts of aconitic acid are dissolved in 340 parts of 2-ethyl butanol and the solution boiled under a reflux condenser in the presence of a small amount of sulphuric acid until approximately 54 parts of water are removed. The ester is neutralized with a small amount of aqueous sodium hydroxide solution, is dried and freed from an excess of 2-ethyl butanol by heating in vacuo. After filtering the ester from solid salts, 420 parts of a pale yellow liquid are obtained which is almost pure tri (ethyl butyl) aconitate.

420 parts of the ester are reacted with 105 parts of sodium bisulphite in the presence of 150 parts of ethyl alcohol and 75 parts of water as the solvent, until a sample is completely soluble in water. The reaction mixture is filtered and dried to yield 500 parts of an almost white, rubbery solid which easily dissolves in water to form a lathering solution of great wetting strength.

*Example 6.*—258 parts of tri ethyl aconitate are heated in the presence of 260 parts of 2-ethyl hexanol and a small amount of sulphuric acid until 92 parts of ethyl alcohol are distilled off, preferably under a slight vacuum. The residual liquid is di (ethyl hexyl) ethyl aconitate, of which 424 parts are obtained.

422 parts of the ester, 105 parts of sodium bisulphite, 150 parts of ethyl alcohol and 75 parts of water are charged into a container fitted to a reflux condenser and boiled until a sample of the reaction mixture dissolves completely in water. The mixture is filtered and when dried yields a yellow, waxy material which imparts lathering and wetting action to its aqueous solution.

*Example 7.*—258 parts of tri ethyl aconitate are heated in vacuo in the presence of 301 parts of commercial stearyl alcohol of the acetyl number of 186.6 and in the presence of a small amount of sulphuric acid until approximately 46 parts of ethyl alcohol are distilled off. The residual liquid is di ethyl stearyl aconitate.

501 parts of di ethyl stearyl aconitate, 222 parts of an aqueous 45% solution of ammonium bisulphite, 76 gms. of solid ammonium sulphite and 150 parts of ethyl alcohol are heated to boil under a reflux condenser for 12 hours, after which time a sample of the mixture is completely soluble in water. The reaction mixture, on standing, separates into two layers. The bottom layer contains mineral salts and is discarded. The top layer is dried and yields 601 parts of a soft, waxy mass which, when dissolved in water, yields a solution of great lathering strength.

*Example 8.*—174 parts of aconitic acid, 450 parts of commercial secondary heptyl alcohol and 12 parts of para toluene sulphonic acid are heated under a reflux condenser until 61 parts of water are removed and the acidity of the reaction mixture indicates an esterification of the acid to approximately 94%. The esterification mixture is neutralized with a 20% aqueous solution of sodium hydroxide and is then distilled at a vacuum of 1-2 mm. The fraction boiling between 218 and 230° C. is a mixture of various secondary tri heptyl aconitates, of which 356 parts were obtained.

350 parts of this ester were, in the presence of 100 parts of ethyl alcohol and 50 parts of water, reacted with 78 parts of sodium bisulphite, until a sample indicated complete solubility in water. The filtered reaction mixture, on drying, yielded 418 parts of a rubbery, slightly yellowish solid which imparts lathering action and wetting power to its solutions in water.

*Example 9.*—460 parts of a mixture of undistilled trialkylaconitates, prepared by esterifying aconitic acid with a fraction boiling from 150–160° C. of the commercially obtainable mixture of higher aliphatic alcohols formed as a by-product in the catalytic synthesis of methanol from carbon monoxide and hydrogen and containing substantial portions of primary and secondary heptyl and octyl alcohols, were reacted, in a closed vessel, at 100° C. with 120 parts of potassium bisulphite, in the presence of 150 parts of ethanol and 75 parts of water as the solvent. The desired reaction product, a mixture of crude trialkyl potassium sulpho-tricarballylates, is obtained from the reaction mixture by neutralizing it with potassium hydroxide and separating solid potassium sulphite by filtration. The mahogany colored filtrate is dried and 555 parts of a rubbery, brown, transparent solid is obtained. The solid is readily soluble in water and organic solvents and the solutions exhibit surface active properties.

*Example 10.*—35 parts of aconitic acid and 21 parts of sodium bisulphite were, in the presence of 11 parts of water, reacted in a closed vessel at 150° C. for several hours. After drying the reaction mixture, 56 parts of the monosodium salt of the sulpho-tricarballylic acid were obtained. The salt is strongly acid and easily soluble in water. Its neutral alkali metal as well as alkaline earth metal salts are likewise very soluble in water and the former salt, when present in a solution, prevents the precipitation of lime and magnesia soaps.

*Example 11.*—50 parts of ethane tricarboxylic acid were dissolved at 40° C. in 150 parts of strong fuming sulphuric acid and the solution agitated overnight at the same temperature. The reaction mixture was diluted with ice and the excess sulphuric acid removed with barium hydroxide. The remaining solution, on careful drying in vacuo, left a syrup consisting, according to an analysis of 34 parts of mono sulpho and 66 parts of disulpho ethane tricarboxylic acid.

*Example 12.*—Tri cyclohexyl aconitic acid ester was prepared by esterifying aconitic acid with cyclo hexanol. 140 parts of the undistilled ester which was freed from an excess of cyclohexanol by heating it to 180° C. under a vacuum of 2 mm. Hg, was reacted with 76 parts of a 45% aqueous ammonium bisulphite solution, in the presence of 50 parts of alcohol as a mutual solvent and 17 parts of ammonium sulphite as a buffer, by agitating this mixture at a boiling temperature of 83° to 89° C. until a sample is completely soluble in water. The reaction mixture, on standing, separates into two layers. The bottom layer, containing ammonium sulphite and unreacted ammonium bisulphite, is removed. The top layer is evaporated to dryness. The product which is tri cyclohexyl ammonium sulpho-tricarballylate, is an amber colored, transparent, rubbery material. It is soluble in water and organic solvents and is an excellent wetting agent.

*Example 13.*—302 parts of the tri-butoxy diethylene glycol ester of aconitic acid, obtained by the esterification of aconitic acid with the butyl ether of diethylene glycol, are sulphonated with sodium bisulphite as described in Example 8. The product which is the sodium salt of tri-butoxy diethylene glycol sulpho-tricarballylate is a gelatinous, very water soluble material of good wetting strength.

*Example 14.*—174 parts of aconitic acid are esterified with 375 parts of commercial cetyl alcohol, in the presence of 100 parts of toluene and one part of concentrated sulphuric acid, until approximately 27 parts of water of esterification are removed. To the esterification mixture which is essentially a mixture of mono, di and tri cetyl aconitic acid esters, there are added 116 parts of ammonium sulphite, 100 parts of water and 200 parts of ethanol. This mixture is heated to 83° to 89° C. under a reflux condenser until the reducing value of a sample indicates complete reaction through the practical disappearance of sulphurous acid. The mixture is neutralized with aqueous ammonia and dried. A soap-like material is obtained which easily emulsifies in hot water and which is very useful as a softening agent for textile materials.

*Example 15.*—16 parts of the mixture of free sulpho ethane tricarboxylic acids as prepared in Example 11 were esterified in boiling 2-ethyl butanol and the resulting mixture neutralized with caustic soda solution. The excess of ethyl butanol was distilled off in vacuo. The residue, an amber colored, rubbery solid is completely soluble in soft and hard water to form lathery solutions of great wetting strength.

*Example 16.*—56 parts of the mono sodium salt of sulpho-tricarballylic acid, prepared as described in Example 10, are esterified by heating to 155° C. under a reflux condenser in the presence of a large excess of 2-ethyl butanol and one part of toluene sulphonic acid as the esterification catalyst until approximately 10 parts of water of esterification are removed and the acidity of a sample of the esterification mixture indicates an esterification of the sulpho acid to approximately 95% completion. The mixture is then neutralized with caustic soda solution and the excess of ethyl butanol is recovered by steam distillation. The residual aqueous solution is evaporated to dryness. The material obtained is a yellowish, resin-like mass which is readily soluble in water and organic solvents and which, for most practical purposes, is identical with the products obtained in Examples 2 and 5.

*Example 17.*—100 parts of tri (ethyl butyl) ammonium sulpho-tricarballylate were dissolved in 100 parts of water and shaken at room temperature, with a solution of 200 parts of cupric sulphate in 300 parts of water. After standing, the mixture separates into two layers, the lower containing the copper salt of the tri (ethyl butyl) ester of the sulpho-tricarballylic acid. The layer is drawn off and dried to yield the compound in the form of a green soft mass which is easily soluble in water to give lathery solutions of great wetting strength. The compound is very useful as a spreader in insecticidal compositions.

The foregoing examples are, of course, only illustrative of our invention. The sulpho-tricarboxylic acids can be prepared by sulphonating the tricarboxylic acids or the esters thereof with ordinary sulphonating agents. Unsaturated acids such as aconitic acid can be conveniently sulphonated by adding an alkali metal or ammonium sulphite or bisulphite to either the free acid or to the esters thereof. It is obvious, of course, that in the foregoing examples any desired ester can be formed instead of the particular ester disclosed. Moreover, while in the several examples the formation of tri esters has been described, it is to be understood that the mono or the di esters are also within the contemplation of our invention.

Our new compounds are characterized by possessing exceptional surface active properties. They are not affected by hard water and retain their surface active properties in alkaline as well as acid solutions and, therefore, they are of great importance in industry as wetting agents, detergents or emulsifying agents. A number of typical uses of our new compounds are given below.

The wetting and penetrating properties of our new compounds render them eminently suitable alone or in combination with other washing agents for degreasing, cleansing and scouring of fiber, woodwork, floor coverings, tile, hides, leather and metalware. They may also be used in the retting, sizing, desizing, bleaching, mercerizing, lustering, delustering, weighting, lubricating, finishing, degumming, printing, softening and dyeing of various textile and fibrous materials. Our compounds are especially advantageous as addition agents to digestion liquors used for the liberation of fibrous material from rags, wood chips or other vegetable raw materials that are ordinarily used for the preparation of paper pulp. Incorporated in fibrous sheet materials, they improve the absorbency thereof for water, as in paper toweling, as well as facilitate the impregnation of fibrous sheet materials with various treating solutions such as finishing, softening, stiffening, waterproofing, fireproofing, preserving, filling and dressing compositions.

Our compounds are also useful in the preparation and application of dyestuffs wherein they may be used to prepare soluble, difficultly soluble or pigment dyestuffs in very finely divided form whereby the solution or dispersion thereof is greatly facilitated. They may also be used as dyeing assistants in that their presence in the dyebath assists in the formation of level dyeings and in general facilitates the combination of the dyestuffs with the fiber. They may also be used in printing textile fabrics either by incorporation in the fabric itself or in the printing or discharge pastes.

The dispersing and emulsifying properties of our products render them capable of widespread use in the preparation of a large variety of dispersions and emulsions. For example they may be used to prepare emulsions or dispersions of germicidal, insecticidal and fungicidal materials. They may also be used to disperse or emulsify animal, vegetable or mineral oils, esters, fats and waxes which dispersions or emulsions are useful as cutting, polishing, lubricating, impregnating, coating, dressing, finishing, waterproofing, waxing, sizing and preserving agents. Further uses for our new compounds as dispersing or emulsifying agents are in the preparation of coating and sizing compositions from casein, starch, rosin, gums, higher fatty alcohols, natural and synthetic resins, rubber and asphaltic or bituminous materials. They may also be used to advantage in writing or printing inks and various emulsified paints and varnishes as well as pigment emulsions and mineral filler compositions useful for loading and/or surface coating paper either by beater addition or application to the formed and dried or partially dried web.

Our compounds may also be used for deemulsification purposes as, for example the breaking of emulsions of mineral oil with water. It may also be used in preparations for the treatment of oil carrying strata for the improvement of the yield of oil wells.

They may also be used in any process or composition where their frothing or foaming properties may be utilized. Such uses would involve, for example, the formation of a froth over electrolytic cells to prevent the formation of spray by gases produced in the electrolysis. Other uses in this connection are in the formation of porous fibrous batts, porous concrete or synthetic resin compositions in cellular or porous form as for heat insulating purposes or in the formation of fire-extinguishing foams.

The fields of usefulness of our new compounds are so varied that any recitation thereof is necessarily rather incomplete. The above described uses are intended to be merely suggestive of various typical uses but it is obvious that our compounds are capable of many other uses. In general, it may be said that our new compounds have surface active or capillary active properties and may, therefore, be used to great advantage in any process involving wetting, penetrating, deterging, dispersing, emulsifying, deemulsifying, frothing, foaming, softening and like phenomena. The compounds may be used in pure or standardized form and alone or in combination with any known treating agents with or without the addition of other known materials having surface active properties.

We claim:

1. The method which comprises reacting a member of the group consisting of aliphatic tricarboxylic acids, esters and salts with a sulphonating agent to thereby form the corresponding sulpho-tricarboxylic acid compound.

2. The method which comprises reacting a member of the group consisting of unsaturated aliphatic tricarboxylic acids, esters and salts with a sulphonating agent selected from the group consisting of alkali metal and ammonium sulphites and bisulphites.

3. The method which comprises reacting esters of aconitic acid with a sulphonating agent selected from the group consisting of alkali metal and ammonium sulphites and bisulphites thereby forming the corresponding salt of the sulpho-tricarballylic acid ester.

4. The aliphatic tricarboxylic acid compounds having the formula

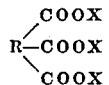

wherein R is an aliphatic radical containing at least one sulphonic acid group and X is a member of the group consisting of hydrogen, ammonium, the radical of an organic base, a metal and a radical obtained by dehydroxylation of an alcohol.

5. The aliphatic tricarboxylic acid compounds having the formula

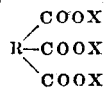

wherein R is an aliphatic radical containing at least one sulphonic acid group and X is a member of the group consisting of hydrogen, ammonium, the radical of an organic base, a metal and a radical obtained by dehydroxylation of an alcohol, at least one X being the radical obtained by dehydroxylation of an alcohol.

6. The aliphatic tricarboxylic acid compounds having the formula

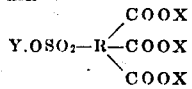

wherein R is an aliphatic radical, Y is a member of the group consisting of hydrogen, ammonium, the radical of an organic base and a metal and X is a member of the group consisting of hydrogen, ammonium, the radical of an organic base, a metal and a radical obtained by dehydroxylation of an alcohol.

7. The aliphatic tricarboxylic acid compounds having the formula

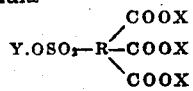

wherein R is an aliphatic radical, Y is a member of the group consisting of hydrogen, ammonium, the radical of an organic base and a metal and X is a member of the group consisting of hydrogen, ammonium, the radical of an organic base, a metal and a radical obtained by dehydroxylation of an alcohol, at least one X being the radical obtained by dehydroxylation of an alcohol.

8. The esters of aliphatic sulpho-tricarboxylic acids having the formula

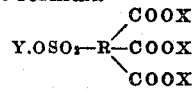

wherein R is an aliphatic radical, Y is a member of the group consisting of hydrogen, ammonium, the radical of an organic base and a metal and X is the radical obtained by dehydroxylation of an alcohol.

9. Compounds of the following general formula

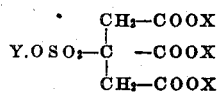

wherein Y is a member of the group consisting of hydrogen, ammonium, the radical of an organic base and a metal and X is a member of the group consisting of hydrogen, ammonium, the radical of an organic base, a metal and a radical obtained by dehydroxylation of an alcohol.

10. Compounds of the following general formula

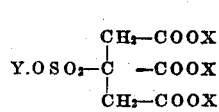

wherein Y is a member of the group consisting of hydrogen, ammonium, the radical of an organic base and a metal and X is the radical obtained by dehydroxylation of an alcohol.

11. An ester of a sulphotricarballylic acid.

12. An ester of a sulphotricarballylic acid of the formula $$MeO_3S.Al.(COO)_3R_1R_1R_1$$

in which Me is a member of the group consisting of hydrogen and salt-forming bases, Al is a saturated aliphatic carbon chain of three carbon atoms, and each $R_1$ is an alcohol radical.

13. An ester of sulphotricarballylic acid in which at least one carboxyl group is esterified with an aliphatic alcohol.

14. An ester of sulphotricarballylic acid in which at least one carboxyl group is esterified with an aliphatic alcohol of at least three carbon atoms.

15. A trialkyl sulphotricarballylate.

16. A compound selected from the group consisting of sulphonated aliphatic tricarboxylic acids and esters thereof.

17. The 2-ethyl butyl ester of sulphonated aconitic acid.

18. A water-soluble salt of an ester of a sulphonated aliphatic tricarboxylic acid.

19. A water-soluble salt of the 2-ethyl butyl ester of sulphonated aconitic acid.

20. A water-soluble salt of the ester of sulphonated aconitic acid and methyl iso-butyl carbinol.

21. A triamyl sulphotricarballylate.

PAUL NAWIASKY.
GERHARD EWALD SPRENGER.